United States Patent
Harper et al.

(10) Patent No.: US 6,996,751 B2
(45) Date of Patent: Feb. 7, 2006

(54) METHOD AND SYSTEM FOR REDUCTION OF SERVICE COSTS BY DISCRIMINATION BETWEEN SOFTWARE AND HARDWARE INDUCED OUTAGES

(75) Inventors: Richard Edwin Harper, Chapel Hill, NC (US); Steven Wade Hunter, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 548 days.

(21) Appl. No.: 09/929,142

(22) Filed: Aug. 15, 2001

(65) Prior Publication Data

US 2003/0037288 A1 Feb. 20, 2003

(51) Int. Cl.
*G06F 11/00* (2006.01)

(52) U.S. Cl. .................... 714/48; 714/46; 719/318; 702/183

(58) Field of Classification Search ............... 714/46, 714/57, 37, 48, 22, 20, 14, 1, 2, 39, 26; 719/318; 702/184, 183
See application file for complete search history.

(56) References Cited

U.S. PATENT DOCUMENTS

| 5,790,780 | A | * | 8/1998 | Brichta et al. ............... 714/46 |
| 6,021,262 | A | * | 2/2000 | Cote et al. .................... 714/48 |
| 6,167,538 | A | * | 12/2000 | Neufeld et al. .............. 714/47 |
| 6,584,430 | B1 | * | 6/2003 | Rosenbaum et al. ........ 702/183 |
| 6,708,291 | B1 | * | 3/2004 | Kidder ......................... 714/39 |
| 2001/0018691 | A1 | * | 8/2001 | Sakakibara et al. ....... 707/104.1 |
| 2002/0007468 | A1 | * | 1/2002 | Kampe et al. ................. 714/4 |
| 2002/0138235 | A1 | * | 9/2002 | Edwards et al. ............ 702/184 |
| 2002/0138786 | A1 | * | 9/2002 | Chefalas et al. ............. 714/37 |
| 2002/0194047 | A1 | * | 12/2002 | Edinger et al. ................ 705/9 |

* cited by examiner

Primary Examiner—Robert Beausoliel
Assistant Examiner—Christopher McCarthy
(74) Attorney, Agent, or Firm—E. Dwayne Nelson, Esq.; McGinn IP Law Group, PLLC

(57) ABSTRACT

A method (and system) of reducing warranty costs includes discriminating between hardware- and software-induced problems or outages in a computer system.

29 Claims, 3 Drawing Sheets

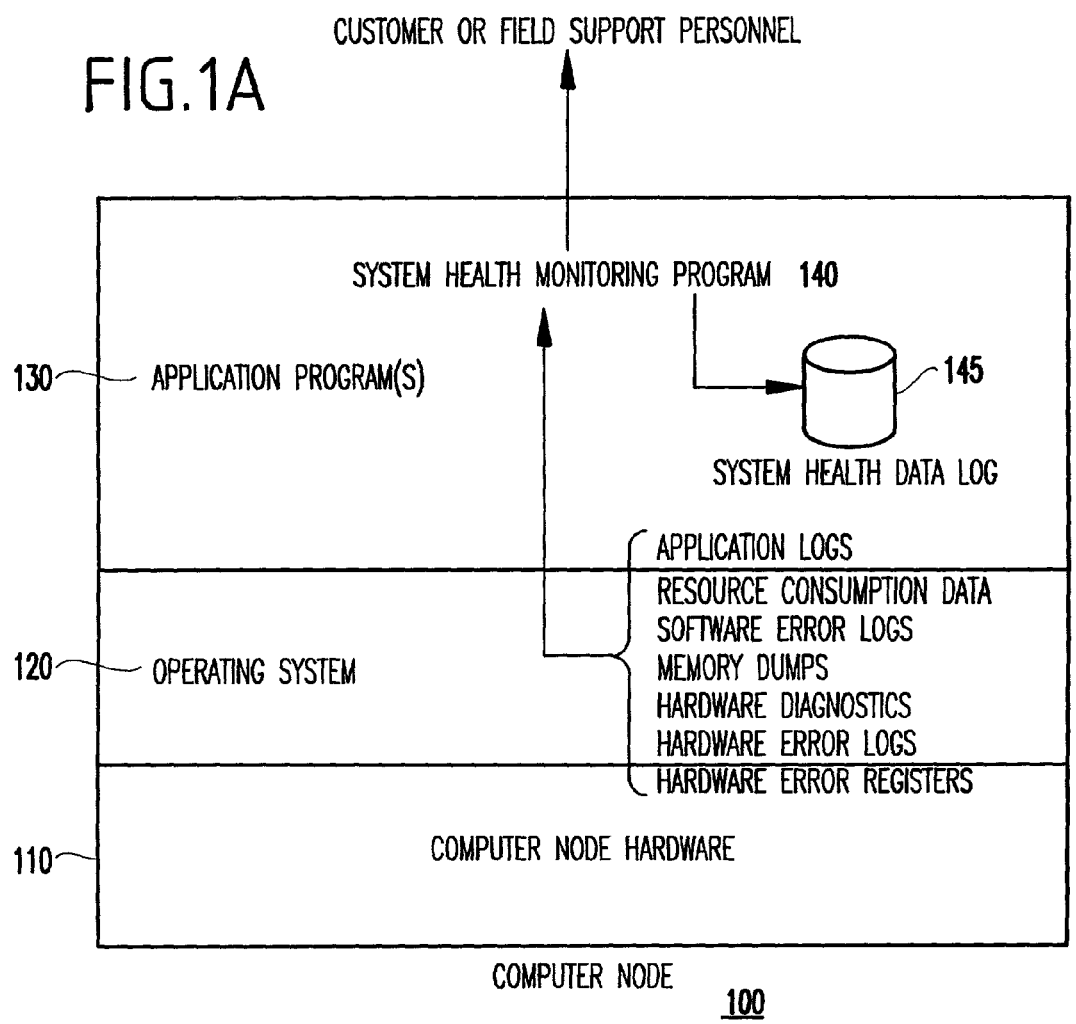
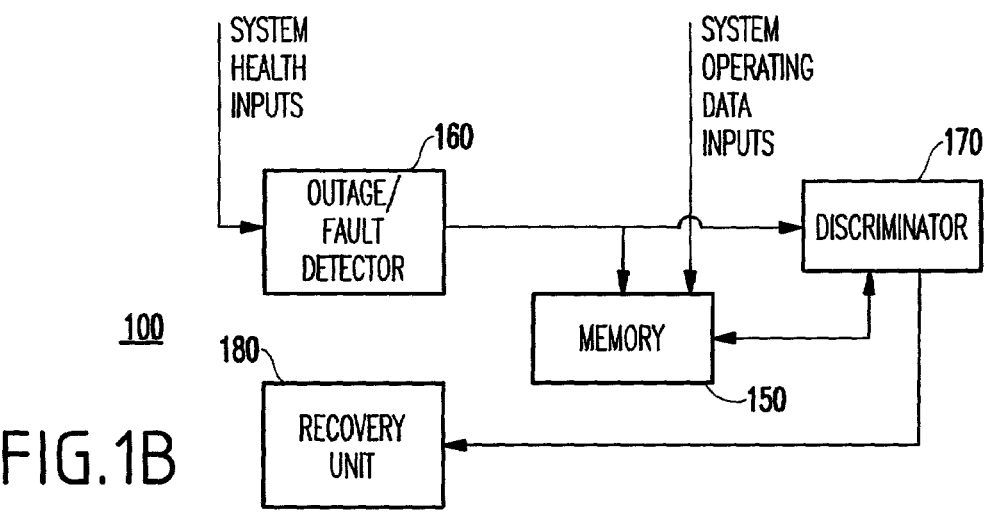

METHOD AND SYSTEM FOR REDUCTION OF SERVICE COSTS BY DISCRIMINATION BETWEEN SOFTWARE AND HARDWARE INDUCED OUTAGES

BACKGROUND OF THE INVENTION

1. Field of the Invention

The present invention generally relates to a method and system for distinguishing between software-induced and hardware-induced problems or outage events, and more particularly to a method and system for reducing warranty expenses by automatically distinguishing between software-induced problems or outage events and hardware-induced problems or outage events, and further to pinpointing the hardware or software cause of the problem or outage event when a service call is required.

2. Description of the Related Art

When a customer experiences a problem or outage event with a computer system, oftentimes the customer or field service engineer does not know whether the event was caused by a hardware problem or a software problem. It is well-documented that many outages in computer systems (40% or more) are due to software problems.

It is further known that, when it is not possible to discriminate between a software- or hardware-caused event, the customer or field service engineer often assumes that the problem is due to hardware, in which case customer/field service engineer often returns to the Original Equipment Manufacturer (OEM) such as IBM or the like, all hardware suspected of being the cause of the problem (or in many cases the entire system).

However, much of this hardware is in fact not defective, with the net result being that a large percentage (often higher than 40%) of hardware parts returned to the OEM under warranty are tested at the OEM's facility and classified as "No Defect Found"(NDF). "NDF" means that the OEM could not replicate the customer's problem with that particular piece of hardware.

Unfortunately, by this time, much of the cost of service (including the initial call to the OEM, the time required to perform problem determination, the time required to travel to the customer site and perform the service, the replacement parts, the time required to test the returned parts, and the cost of disposing or redeploying nondefective returned parts) has already been incurred by the OEM.

An additional burdensome cost is incurred when the service technician must execute a lengthy diagnosis procedure (e.g., either on-site or remotely) in an attempt to replicate the problem, in order to identify which hardware or software subsystem is responsible for the event. During this time, the system is usually unavailable.

Yet another cost is incurred when the technician arrives at the customer site only to find out that the technician does not have the correct hardware or software to repair the root cause of the event.

Thus, these operations are extremely expensive, especially for a large corporation with thousands of units in the field. Indeed, the cost due to NDFs can easily run into tens of millions of dollars per year. Moreover, customer goodwill may be lost or degraded due to the inconvenience (and loss of the machine in question) to the customer.

Further, running and interpretation of the diagnostics often requires a highly skilled technician, whose time is a highly limited and valuable resource.

Hence, prior to the invention, there has been no inexpensive mechanism for identifying whether the problem is a hardware- or a software-induced problem, misconfiguration, or the like.

SUMMARY OF THE INVENTION

In view of the foregoing and other problems, drawbacks, and disadvantages of the conventional methods and structures, an object of the present invention is to provide a method and structure in which a variety of different sources of information are pulled together to more sharply discriminate whether a hardware problem or a software problem exists in a system undergoing failure or an outage.

Indeed, the present inventors have recognized that to reduce the above and other costs, it is first desirable for a system that has experienced a problem or outage event to automatically indicate whether a service call is required at all.

If so, the present inventors have recognized that it is further desirable to provide the service organization with a clear indication of the subsystem that was most likely to have caused the event to reduce problem determination time, prevent the return of nondefective hardware, and allow the service technician to be sure that when he or she arrives at the customer premises, the technician has the correct hardware or software part to repair the fault. As mentioned above, prior to the present invention, no system or method for reducing such costs have been known.

In a first aspect of the present invention, a method (and system) of reducing warranty costs by discriminating between a hardware-induced problem or outage and a software-induced problem or outage in a computer system.

In a second aspect, a method (and system) includes a method of reducing a trouble-shooting cost in a computer system, including sampling system health data from a plurality of sources, and storing the data in a log, determining whether an outage event has occurred, and, based on whether an outage even occurs, analyzing logged and other data to judge a likely cause of the event.

In a third aspect, a computer node associated with a computer system includes hardware for executing an operating system, at least one application program, and a system health monitoring program, wherein the system health monitoring program gathers system software and hardware health data from an application program, an operating system, and the hardware, and discriminates a cause of an event including at least one of a problem or outage of the computer node.

In a fourth aspect, a system for use with a computer system, includes an outage detector for detecting an outage, a memory for storing pre-outage data of the system, and a discriminator for discriminating whether the outage was caused by a hardware component or a software component of the system.

With the unique and unobvious aspects of the invention, warranty expenses may be reduced by automatically distinguishing between software-induced problems or outage events and hardware-induced problems or outage events, and thus reducing unnecessary service calls.

Additionally, the invention allows the pinpointing of the hardware or software cause of the problem or outage event when a service call is required.

Using the present invention, a software program continuously monitors and permanently logs various indicators of software and hardware health, including all such information about the system just prior to an event. After occurrence of an event, the software program analyzes these indicators of system health as well as additional information generated by the event (a process known as First Failure Data Capture, or FFDC), makes a determination of whether the likely cause of the event was software or hardware, and makes this information available to the customer or field support personnel.

Additionally, the software program identifies which software subsystem (e.g., process, file system, networking stack, etc.) or hardware subsystem (e.g., processor, memory, I/O device, disk, etc.) is the most likely culprit, and provides this information to the customer or field support personnel to reduce diagnosis time in the event that it is desired to trace the problem to its root cause.

Thus, in some cases, such as when a software failure caused the event and the software simply needs to be restarted automatically, a service call can be totally eliminated. For example, pre-crash indicators of resource exhaustion parameters might indicate that a system disk was full at the time of the problem or outage, and that this phenomenon was probably causal. Upon reboot, this information could be used to notify the customer that no manual service call is necessary, and then perhaps trigger an automatic program that frees up space on the full disk by removing temporary files, core dumps, and other useless items, compacting the information on the disk, etc. In other cases, such as when a hardware failure can be accurately localized to a particular device such as a disk controller and a manual repair action is mandatory, the service call duration can be substantially shortened.

While this technique is not expected to be 100% accurate, (i.e., some software failures will not be identified as such, some hardware failures will be misclassified as software failures, and some failures will be unclassifiable via automatic mechanisms), even a modest degree of diagnostic accuracy (e.g., say 50%) can have a significant economic impact on warranty expenses.

BRIEF DESCRIPTION OF THE DRAWINGS

The foregoing and other purposes, aspects and advantages will be better understood from the following detailed description of a preferred embodiment of the invention with reference to the drawings, in which:

FIG. 1A schematically illustrates a system 100 according to the present invention;

FIG. 1B illustrates a high level architecture and component blocks of the system 100 according to the present invention;

DETAILED DESCRIPTION OF PREFERRED EMBODIMENTS OF THE INVENTION

Figure 2:
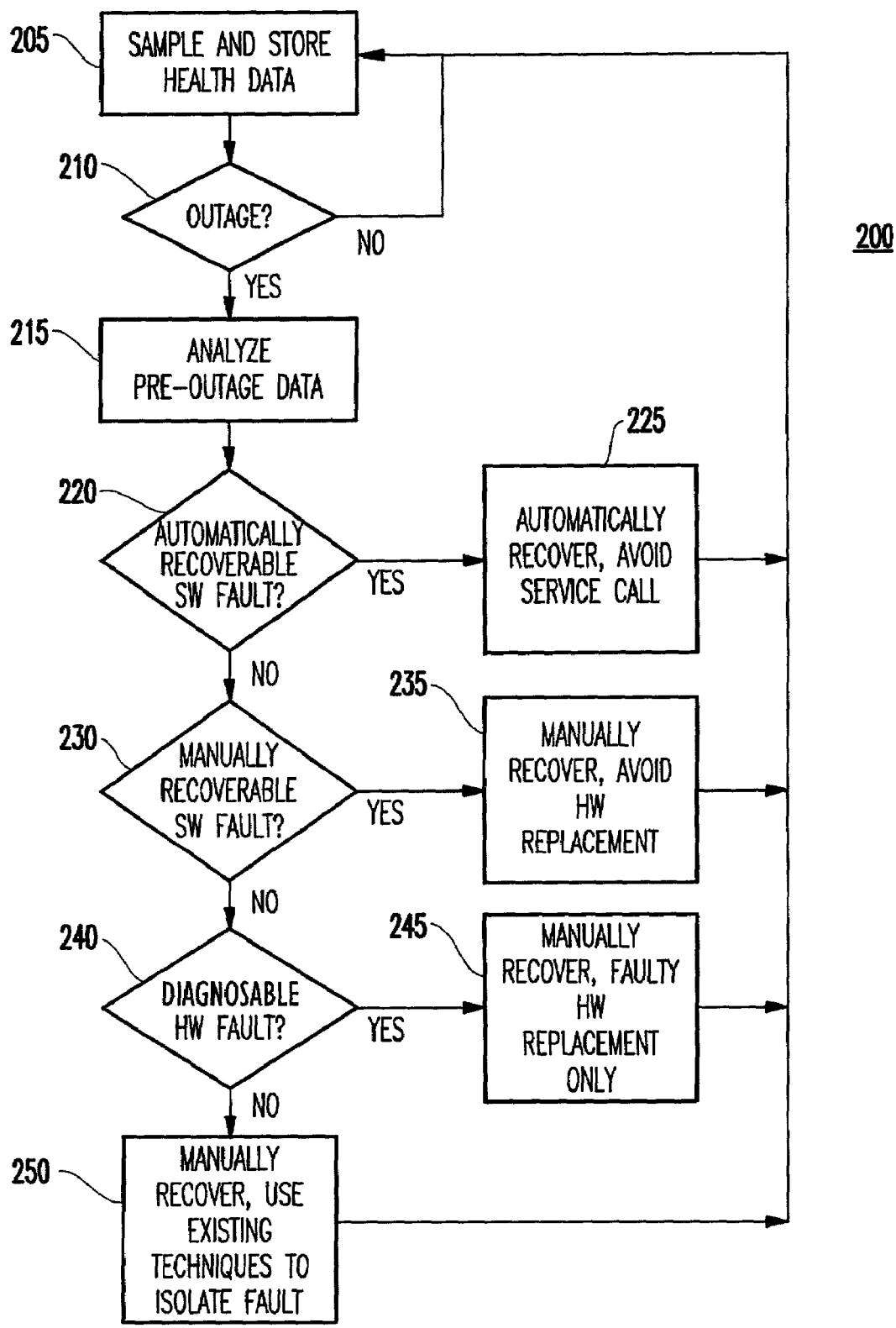
FIG. 2 illustrates a flowchart of the a method 200 according to the present invention.

Referring now to the drawings, and more particularly to FIGS. 1A–4, there are shown preferred embodiments of the method and structures according to the present invention.

Preferred Embodiment

Prior to describing the invention in detail, it is noted that the preferred embodiment to be described below is within the context of one or more computer nodes 100 shown in FIG. 1A, each having the following capabilities (and as further described below with regard to FIGS. 1B and 2).

That is, as shown in FIG. 1A, each node includes hardware components 110 such as a general purpose computer system for executing the operating system 110, application program(s) 130, and system health monitoring program 140 described hereinbelow.

The system health monitoring program 140 collects system software and hardware health data from application programs 130, operating system 120, and the hardware resources 110.

A computer system provides several sources of information that can be used to assess software and hardware health. The following non-exhaustive list indicates the sources of information that might be measured and logged prior to the failure event.

For example, to determine software health, the system health monitoring program 140 can monitor resource consumption data, system and application software error logs, system utilization and performance data, and software error counts.

To determine hardware health, the system health monitoring program 140 can use resources such as concurrent diagnostics, hardware error logs, and hardware error counts. Additional FFDC information is available after the event, such as (again) error logs, crash dumps of memory, error codes, offline or power-on hardware diagnostics, and hardware error registers.

Additionally, the system health monitoring program 140 includes a mechanism (e.g., log 145) for permanently storing a time history of system software and hardware health data on a log device, which can then be read after an event to determine the likely cause of the event. That is, log 145 stores the data gathered across the outage (e.g., the data is available after the outage has occurred).

Further, the system diagnosis service (e.g., which may be incorporated into the System Health Monitoring Program 140 or which may be provided separately from the monitoring) includes a mechanism for analyzing the software and hardware health data. This service can either run on the system that has experienced the problem, or on another execution environment such as a service processor or another computer entirely.

Additionally, a mechanism is provided for notifying the customer or field service support personnel regarding the cause of the outage or problem, whether a service call is necessary, and where the likely cause of the outage or problem lies.

To further illustrate the invention and the functions described above, FIG. 1B shows a high level architecture of the system 100 according to the present invention. As shown, the system blocks include a memory 150 for storing data gathered for the subject machine. Memory 150 may be formed of the log file 145 or may further include other memory elements as well. Memory 150 stores the system operating data inputs (e.g., pre-outage data).

An outage/fault detector 160 is provided for detecting either an outage of the subject machine or something less than a complete outage such as a lack of performance, a fault/defect, etc. The outage/fault detector receives system health inputs from the system hardware and software to detect the outage or lack of performance, and provides an input to the memory and/or a discriminator 170 upon occurrence of an outage.

Upon occurrence of an outage/fault, the discriminator 170 (which includes the system health monitoring program 145 of FIG. 1A) receives a signal from the detector 160 to request pre-outage data from memory 150 (or alternatively is automatically provided with pre-outage data from the memory upon the indication of an outage from the detector 160 to the memory 150).

Then, the discriminator 170 examines the data and judges whether the outage/fault which occurred is due to faulty hardware or software and discriminates the faulty hardware or software component (and manufacturer of the same).

Thereafter, a signal is sent to the customer or field support personnel to operate a recovery unit 180.

It is noted that discriminator 170, based on the data gathered, can generate a description of a region which characterizes an outage such that the discriminator can predict an approach to the region of the outage. Such a prediction can be made based on the techniques described in U.S. patent application Ser. No. 09/442,001, entitled "METHOD AND SYSTEM FOR TRANSPARENT SYMPTOM-BASED SELECTIVE SOFTWARE REJUVENATION", to Harper et al., commonly-assigned and incorporated herein by reference. As a result of such a prediction, the system could then take some "self-help" measures to avoid the outage. Hence, the discriminator becomes a "characterizer" of the outage region/space.

Turning now to the flowchart of FIG. 2, a method of reducing warranty costs by discriminating between a hardware-induced problem or outage and a software-induced problem or outage in a computer system is shown and is described hereinbelow.

That is, an exemplary implementation of the present invention is exemplified in the logic flow described below and depicted in the flowchart of FIG. 2.

First, in step 205, the System Health Monitoring (SHM) agent periodically samples the system health data from the sources described above and stores it into the SHM log 145 (e.g., shown in FIG. 1). It is noted that the data can be sampled continuously or at every predetermined interval. The SHM log 145 is resident typically on a user's machine, as is the monitoring agent.

In step 210, it is determined whether an outage has occurred. If not (e.g., a "NO"), then the process loops back to step 205.

If so (e.g., a "YES"), then the process continues to step 215. Hence, after a problem or outage event occurs, the SHM analyzes the logged and FFDC data to determine the cause of the event.

Then, the process continues to step 220 and beyond.

That is, if the event is due to software and automatic recovery is possible (e.g., a "YES" in step 220), then in step 225 the SHM 140 invokes the automatic recovery mechanism and notifies the customer or field support personnel that it is a software problem, and identifies the faulty subsystem for subsequent optional troubleshooting. In this case, a service call and any hardware replacement that would have caused an NDF can be completely avoided.

However, if the event is due to a software issue, yet automatic recovery is not possible (e.g., a "NO" in step 220) (e.g., the customer must update a system software component, or manually clear a software error condition), then the SHM 140 indicates that the error is due to software, and is not automatically recoverable. In this case, some form of customer or service technician activity is necessary, but no hardware replacement that could cause an NDF occurs. That is, the system is manually recovered (e.g., by the user or the technician) and hardware replacement is avoided, thereby saving costs for the OEM.

If the fault is not an automatically recoverable software fault (e.g., a "NO" in step 220) or a manually recoverable software fault (e.g., a "NO" in step 230), then in step 240 it is determined whether a diagnosable hardware fault exists.

That is, if the event is determined to be caused by hardware (e.g., a "YES" in step 240), then the SHM indicates this fact and by examination of the hardware error logs, error registers, and hardware diagnostics attempts to localize the replaceable component that caused the outage. It then informs the customer or field service technician that the outage was due to hardware, and indicates the culprit component. In this case, a service call is required, but its duration is shortened and the likelihood of an NDF is reduced because of knowledge of the defective component.

Thus, in step 245, the hardware/system can be manually recoverable, but only the defective hardware needs to be replaced, as opposed to shipping an entire new system and thereby replacing all of the hardware.

If the SHM cannot resolve any of the above cases, then in step 250, a routine service call is indicated, in which the current state of the art techniques for diagnosing the event cause are executed such as manual error log analysis, manual dump analysis, and manual hardware offline diagnostics.

It is noted that, as the "boxes" (steps) 225, 235, and 245 are traversed in FIG. 2, the cost to the OEM increases. Thus, it is preferable in the example given that the problem be solved as soon as possible (e.g., box 225 is most preferable).

Further, it is again noted that the monitoring agent is found on the customer/user's machine and continuously monitors the machine, and upon an outage occurring, a call is made typically to the OEM's help center (and/or field service technician) who obtains the information and analyzes the pre-outage data. However, it is noted that "self-help" could be performed, in which case the user's computer itself could analyze the data and the call to the help center could be avoided entirely.

For example, if the user's computer had a bad device driver, then an analysis of the pre-outage data would be made on the user's machine to determine that the device driver is defective, in which case a call could be made by the user (or message transmitted by the user's machine) to the device driver manufacturer, as opposed to calling the OEM to find (and remedy) the fault. The same scenario would be applicable if the software fault was that of software produced by someone other than the OEM (e.g., if the Microsoft Windows® operating system was judged defective by the system health monitoring program, then Microsoft's help center would be called). In such a case, the system could be tailored easily, such that, upon identification of a defective software/hardware component (e.g., a non-OEM component), a call/message could be placed automatically (e.g., telephonically or electronically via a network such as the Internet) to the manufacturer/vendor's help center, and hence the OEM would incur no cost since no cost is being placed to the OEM.

Further, in this scenario, once a non-OEM hardware/software fault is detected, a call from the customer to the OEM actually could be blocked in which case the OEM is "taken out of the loop" entirely.

Alternatively, as alluded to above, to ensure that the customer does not attempt to place the call to the OEM in the first place, a modem (or Internet browser) or the like in the customer's machine could automatically send the call/message to the non-OEM manufacturer/vendor. Such an automatic routing system in "realtime" to the "right" vendor would not only save costs for the OEM, but also would preserve goodwill between the customer and the OEM.

EXAMPLE

The following simplified example illustrates the invention in use. For illustrative purposes only, assume that the SHM agent is set up to sample and permanently log system health data once per minute. It samples a plurality of parameters (in practice many more parameters would be sampled than those exemplarily described below).

For example, nonpaged pool bytes may be sampled. This parameter reports the number of bytes that must be kept in physical memory and cannot be paged out to disk. Thus, this is a strictly limited resource. Hence, when this parameter's limit is exceeded, the operating system may fail. A high level of utilization of this parameter therefore implies a software failure.

Another parameter is committed bytes. This parameter reports the number of bytes that reside in physical memory plus the paging files, and is a limited resource. When this parameter's limit is exceeded, the operating system may fail. A high level of utilization of this parameter also implies a software failure.

Yet another parameter is transmission control protocol (TCP) errors. This parameter indicates the number of errors that have been reported by the TCP/IP software. A high rate of TCP errors that are unaccompanied by Network Adapter Errors implies that there is a problem with the TCP/IP software. A high rate of TCP errors that are accompanied by Network Adapter Errors implies that there is a problem with the network adapter (which may indicate a hardware problem).

Indeed, there may be "Network Adapter 1" Errors. This parameter measures the number of errors reported by the software that operates the first network adapter. A high rate of such errors indicates a hardware problem.

Further, there may exist "Network Adapter 2" Errors. This parameter measures the number of errors reported by the software that operates a second network adapter. A high rate of such errors indicates a hardware problem.

Suppose an outage occurs. After the outage, the analysis program is invoked and reads the values of these parameters from the log 145. It observes that there is a large number of TCP errors, but not a correspondingly large number of network adapter errors. Thus, it concludes that the outage was caused by a problem in the TCP software. The analysis program indicates to the user that the outage was caused by TCP software, automatic recovery via reboot is likely to clear the error condition, and no hardware service is required.

Suppose another such system suffers an outage. The analysis program is invoked after the outage and observes a large number of TCP errors and a large number of Network Adapter 1 errors, but no Network Adapter 2 errors.

In such a case, the analysis program can indicate that there is probably a hardware problem, and in fact it is a problem with Network Adapter 1. The analysis program indicates to the user that the outage was caused by a network adapter hardware, which one is faulty, and indicates that a hardware service call is required to rectify the problem. The service technician can furthermore be instructed to ensure to have the correct type of network adapter when servicing the system.

It is noted that such parameters are collected typically on a user machine already. Hence, the collection of the data is merely sent to the OEM and the OEM can determine the cause of the problem by operating the system health monitoring program. By the same token, such a system health monitoring program could be resident on the user's machine.

Thus, if a user has a problem with its hardware (e.g., computer, for example), and a call is made to the OEM (or others), then the OEM can retrieve the log (e.g., holding the pre-outage data as described above) which is resident on the user's machine and the OEM using the system health monitoring program can indicate to the user the cause of the problem.

From these examples, it is believed clear to one of ordinary skill in the art taking the present application as a whole, how the invention should operate in a more complex system.

Figure 3:
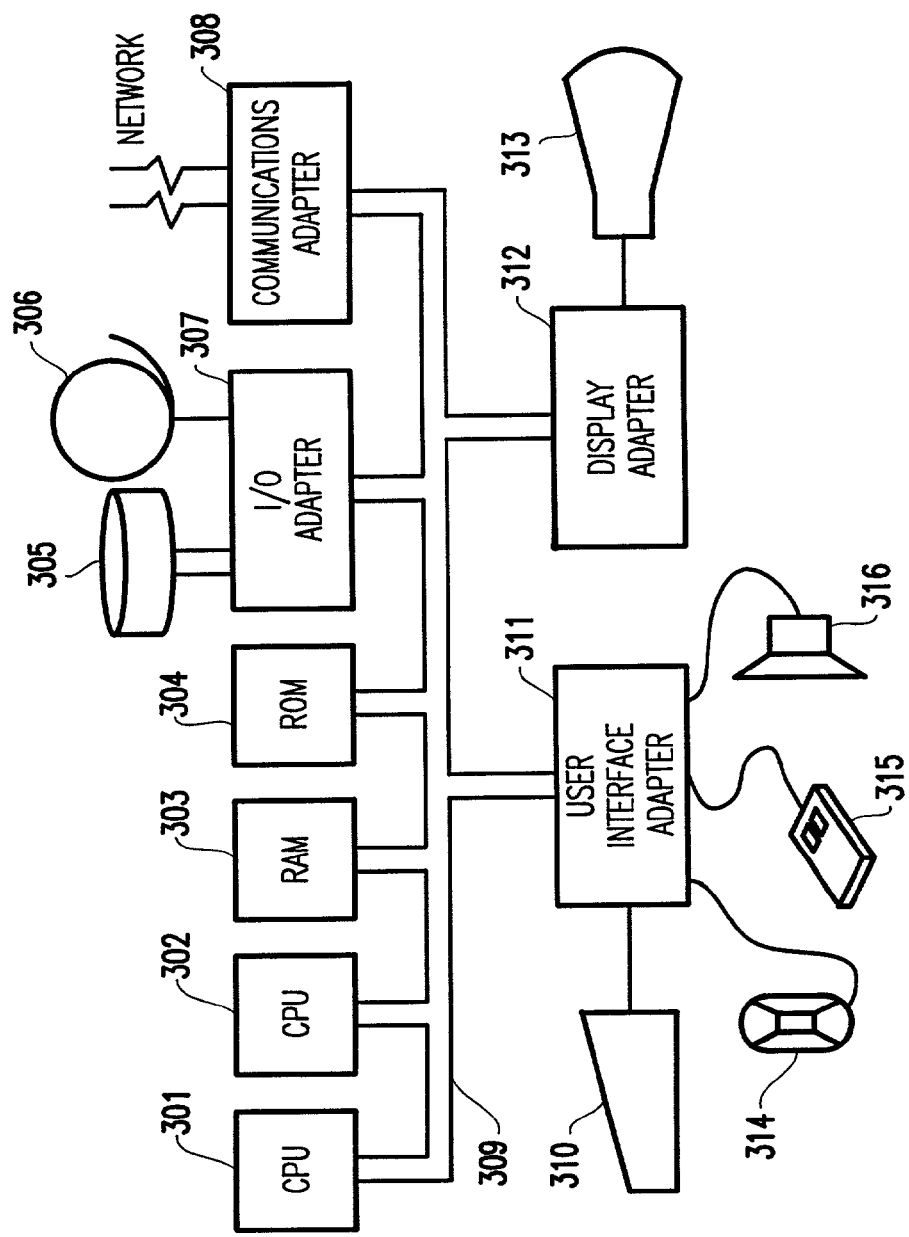
FIG. 3 illustrates an exemplary hardware/information handling system 300 for use with the present invention.

FIG. 3 illustrates a typical hardware configuration of an information handling/computer system in accordance with the invention and which preferably has at least one processor or central processing unit (CPU) 311.

The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, an Intranet, a personal area network (PAN), etc., and a display adapter 336 for connecting the bus 312 to a display device 338 and/or printer 339 (e.g., a digital printer or the like).

Figure 4:
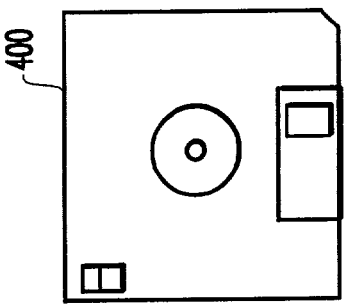
FIG. 4 illustrates a signal bearing medium (e.g., storage medium) 400 for storing steps of a program for reducing warranty costs by discriminating between a hardware-induced problem or outage and a software-induced problem or outage in a computer system, according to the present invention.

As shown in FIG. 4, in addition to the hardware and process environment described above, a different aspect of the invention includes a computer-implemented method according to the present invention, as described above. As an example, this method may be implemented in the particular hardware environment discussed above.

Such a method may be implemented, for example, by operating the CPU 311 (FIG. 3), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 311 and hardware above, to perform the method of the invention.

This signal-bearing media may include, for example, a RAM contained within the CPU 311, as represented by the fast-access storage for example.

Alternatively, the instructions may be contained in another signal-bearing media, such as a magnetic data storage diskette 400 (FIG. 4), directly or indirectly accessible by the CPU 311.

Whether contained in the diskette 400, the computer/CPU 311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, the invention can save a great amount of money and expense for an OEM or the like, by diagnosing the cause of a problem and essentially performing a "triage" on what actions should be taken based on a judgment of the cause of the problem.

While the invention has been described in terms of several preferred embodiments, those skilled in the art will recognize that the invention can be practiced with modification within the spirit and scope of the appended claims.

For example, while it is noted that the flowchart of FIG. 2 (and the description above) indicates a specific "triage" of judging a cause of a problem (e.g., a software issue is judged to exist or not first prior to determining whether a hardware issue is judged to exist), the method could easily look first at whether a hardware fault exists, followed by whether a software fault exists.

Further, it is noted that the invention can determine that more than one type of problem/fault exists (e.g., more than one of a recoverable software fault, a non-recoverable fault, and a hardware fault, may exist).

What is claimed is:

1. A method of reducing warranty costs, comprising:
monitoring indicators in a computer system;
discriminating, by said computer system, between a hardware-induced problem or outage and a software-induced problem or outage in the computer system based on said indicators;
periodically storing said indicators prior to the problem or outage; and
automatically recovering from said software-induced problem or outage without any communication to a web site and without a transmission of a recovery action to a user.

2. The method according to claim 1, wherein said indicators comprise indicators of system software and hardware health.

3. The method of claim 2, further comprising:
analyzing said indicators to determine whether the problem or outage was due to hardware or software, after the problem or outage occurs.

4. The method of claim 3, further comprising:
presenting information regarding a cause of the problem or outage to a user of the computer system to prevent an unnecessary service call and hardware replacement.

5. The method of claim 1, further comprising:
depending upon said determining of said hardware-induced problem or outage or said software-induced problem or outage, determining a manufacturer of said hardware or said software having undergone said problem or said outage.

6. The method of claim 1, wherein, in event of one of a hardware-induced problem or outage and a software-induced problem or outage, pre-outage data is stored in a log file across the outage.

7. The method according to claim 1, wherein said indicators comprise indicators of said software health comprising at least one of resource consumption data, system and application error logs, system utilization and preference data, and software error accounts.

8. The method according to claim 1, wherein said indicators comprise indicators of said hardware health comprising at least one of concurrent diagnostics, hardware error logs, and hardware error counts.

9. The method according to claim 1, further comprising:
continuously monitoring and storing indicators of system software health and hardware health after said problem or outage.

10. The method according to claim 9, wherein said indicators monitored after said problem or outage comprise at least one of error logs, crash dumps or memory, error codes, offline or power-on hardware diagnostics and hardware error registers.

11. The method according to claim 1, wherein said monitoring comprises:
sampling a plurality of parameters comprising at least one of:
a parameter indicating a number of bytes that must be kept in physical memory and cannot be paged out to disk;
a parameter indicating a number of bytes that reside in said physical memory plus the paging files;
a parameter indicating a number of errors that have been reported by transmission control protocol (TCP)/Internet Protocol (IP) software; and
a parameter indicating whether said TCP errors are accompanied by Network Adapter Errors.

12. The method according to claim 1, wherein another execution environment is used to perform said monitoring.

13. The method according to claim 1, wherein said monitoring indicators in said computer system comprises monitoring said indicators prior to said problem or outage.

14. The method according to claim 1, wherein said indicators comprise:
indicators of said software health comprising at least one of resource consumption data, system and application error logs, system utilization and preference data, and software error accounts;
indicators of said hardware health comprising at least one of concurrent diagnostics, hardware error logs, and hardware error counts, and
wherein sampling a plurality of parameters comprises at least one of:
a parameter indicating a number of bytes that must be kept in physical memory and cannot be paged out to disk;
a parameter indicating a number of bytes that reside in said physical memory and the paging files;
a parameter indicating a number of errors that have been reported by transmission control protocol (TCP)/Internet Protocol (IP) software; and
a parameter indicating whether said TCP errors are accompanied by Network Adapter Errors.

15. A method of reducing a trouble-shooting cost in a computer system, comprising:
sampling system health data from a plurality of sources, and storing said data in a log;
determining whether said outage event has occurred;
based on whether said outage event occurs, analyzing, by said computer, logged and other data to judge a likely cause of the event; and
if the outage event comprises a software outage or problem, determining whether automatic recovery is possible, and if so, invoking an automatic recovery mechanism and notifying a customer or field support personnel that said software outage or problem is the cause of the event, and identifying a faulty subsystem for subsequent troubleshooting,
wherein said automatic recovery mechanism is conducted without any of communication to a web site and user intervention.

16. The method of claim 15, further comprising:
if the event the outage event comprises a software outage or problem, determining whether automatic recovery is possible, and if not, indicating that the event is due to said software outage or problem, and is not automatically recoverable, and notifying a customer or service technician to manually recover the fault.

17. The method of claim 15, further comprising:
determining whether the event comprises a software outage or problem and if not, determining whether a diagnosable hardware outage or problem exists.

18. The method of claim 17, further comprising:
if the event is judged to be caused by hardware, examining at least one of a hardware error log, an error register, and a hardware diagnostic, and attempting to localize a replaceable component that caused the event;
informing a customer or a service technician that the outage was due to hardware; and
manually recovering the hardware by replacing only defective hardware.

19. A computer node associated with a computer system, comprising:
hardware for executing an operating system, at least one application program, and a system health monitoring program,
wherein said system health monitoring program gathers system software and hardware health data from an application program, an operating system, and the hardware, discriminates, without communication to a website or intervention by a user, a cause of an event comprising at least one of a problem or outage of said computer node, and periodically stores said system software and hardware health data prior to the event.

20. The computer node of claim 19, wherein said computer node comprises sources of information for assessing software and hardware health.

21. The computer node of claim 20, wherein said information is measured and logged prior to a failure event, and
wherein said system health monitoring program monitors at least one of resource consumption data, system and application software error logs, system utilization and performance data, and software error counts.

22. The computer node of claim 19, wherein said system health monitoring program monitors at least one of concurrent diagnostics, hardware error logs, and hardware error counts, and
wherein said system health monitoring program gathers information after the event, including at least one of error logs, crash dumps of memory, error codes, offline or power-on hardware diagnostics, and hardware error registers.

23. The computer node of claim 19, wherein said system health monitoring program includes a log device for permanently storing a time history of system software and hardware health data, said log device being readable after an event to determine a likely cause of the event.

24. The computer node of claim 19, wherein said system health monitoring program includes an analyzer for analyzing the software and hardware health data.

25. The computer node of claim 24, wherein said analyzer is run on one of the computer system that has experienced a problem, and another execution environment.

26. The computer node of claim 19, wherein said system health monitoring program comprises a notifier for notifying a customer or field service support personnel regarding a cause of the outage or problem, whether a service call is necessary, and where the likely cause of the outage or problem resides.

27. The computer node of claim 19, wherein said system health monitoring program samples a plurality of parameters, said plurality of parameters including at least one of:
a parameter indicating a number of bytes that must be kept in physical memory and cannot be paged out to disk;
a parameter indicating a number of bytes that reside in said physical memory plus the paging files;
a parameter indicating a number of errors that have been reported by transmission control protocol (TCP)/Internet Protocol (IP) software; and
a parameter indicating whether said TCP errors are accompanied by Network Adapter Errors.

28. A system for use with a computer system, comprising:
a software program for monitoring indicators in a computer;
an outage detector for detecting a problem or outage;
a memory for periodically storing said indicators prior to the problem or outage; and
a discriminator for discriminating, without any communication to a website or intervention by a user, whether said problem or outage was caused by a hardware component or a software component of said system.

29. The system according to claim 28, wherein, in event of an outage of one of said hardware and software, said indicators stored prior to the problem or outage are stored across the outage.

* * * * *